United States Patent [19]
Johnson et al.

[11] Patent Number: 4,695,880
[45] Date of Patent: Sep. 22, 1987

[54] ELECTRONIC INFORMATION DISSEMINATION SYSTEM

[75] Inventors: Terry W. Johnson, Birmingham; Daryl E. Harms, Mountain Brook; Ricky L. Curl, Pinson, all of Ala.

[73] Assignee: Postron Corp., Birmingham, Ala.

[21] Appl. No.: 760,491

[22] Filed: Jul. 30, 1985

[51] Int. Cl.$^4$ .......................... H04H 1/04; H04N 7/10
[52] U.S. Cl. ...................................... 358/86; 358/258; 455/5; 340/825.47
[58] Field of Search ................. 358/86, 146, 258, 257; 455/4; 340/825.47, 825.53

[56] References Cited
U.S. PATENT DOCUMENTS

| | | | |
|---|---|---|---|
| 3,920,895 | 11/1975 | Vieri et al. | 178/26 R |
| 3,938,090 | 2/1976 | Borison et al. | 340/149 A |
| 3,944,724 | 3/1976 | Kilby et al. | |
| 4,014,001 | 3/1977 | Bradley | 340/825.53 |
| 4,021,608 | 5/1977 | Brodeur | |
| 4,106,060 | 8/1978 | Chapman, Jr. | 358/86 X |
| 4,179,747 | 12/1979 | Dlugos | 364/900 |
| 4,187,520 | 2/1980 | Beduchaud et al. | 358/258 X |
| 4,207,598 | 6/1980 | Reich et al. | 368/257 |
| 4,277,837 | 7/1981 | Stuchert | 364/900 |
| 4,322,854 | 3/1982 | Bundens et al. | 455/5 |
| 4,361,726 | 11/1982 | Drabing et al. | 178/23 R |
| 4,380,009 | 4/1983 | Long et al. | 340/825.55 |
| 4,383,257 | 5/1983 | Giallanza et al. | 340/825.47 |
| 4,390,952 | 6/1983 | Dlugos | 364/464 |
| 4,398,250 | 8/1983 | Hosono | 364/404 |
| 4,410,961 | 10/1983 | Dlugos et al. | 364/900 |
| 4,410,962 | 10/1983 | Daniels et al. | 364/900 |
| 4,414,579 | 11/1983 | Dattilo et al. | 358/256 |
| 4,533,948 | 8/1985 | McNamara et al. | 358/86 X |

FOREIGN PATENT DOCUMENTS 103438 3/1984 European Pat. Off. .............. 358/86
55-145456 11/1980 Japan ................................ 340/825.47

OTHER PUBLICATIONS

"Cable TV Data Service" by M. A. Leonard et al., from *IBM Technical Disclosure Bulletin*, vol. 12, No. 7, Dec. 1969, pp. 1064–1067.
"Two-Way Applications for Cable Television Systems in the '70s", Ronald K. Jurgen, Editor, from *IEEE Spectrum*. Nov. 1971, pp. 39–54.
Gross, "Distribution of Electronic Mail Over the Broad-Band Party-Line Communications Network," *Proceedings of the IEEE*, vol. 58, No. 7, Jul. 1970; pp. 1002–1012.

Primary Examiner—Keith E. George
Attorney, Agent, or Firm—Dann, Dorfman, Herrell and Skillman

[57] ABSTRACT

An electronic information dissemination system electronically distributes information such as bulk mailed letters, bills, and other information from one or more sources to each of a plurality of remote stations located in homes or businesses. The system includes individually addressable receiver/decoders at each remote station. Each receiver/decoder has information processing and memory for identifying its distinct address plus a "global" address common to the plurality of remote stations in the system. Information is gathered from various sources at a centrally located data handling station which encodes the data for transmission to the remote stations. The transmission path is provided by an existing communications network such as CATV or a switched telephone system.

16 Claims, 7 Drawing Figures

FIG. I

ELECTRONIC INFORMATION DISSEMINATION SYSTEM

FIELD OF THE INVENTION

The present invention relates generally to the electronic delivery of mail or other printable text and more particularly to a system for disseminating information from a central location over long distances through existing communication networks to a plurality of remote locations each having an addressable output means for converting the electronic information into human and/or machine readable form.

BACKGROUND OF THE INVENTION

Many improvements have been made in the delivery of mail via electronic means in recent years. Numerous systems have been developed which electronically deliver mail from one city to another via satellite, cable, or microwave. In general, however, these systems have been limited to the type in which the information to be mailed must be initially converted from human readable form into electronic signals. In electronic form, the information or messages may be transmitted over some telecommunications medium to a remote location where it is then reconverted into human readable form. The transmitted information is then finally delivered to the addressee or ultimate receiver in hard copy or other human readable form such as on a CRT screen. It seems clear that any advantage of such systems in speed of delivery is limited or offset by the need to convert from and then reconvert to human readable forms of communication. Even in current systems where the information is generated in electronic form, such as on a word processor, and transmitted in electronic form, the cost of receiving and output equipment can be prohibitively expensive: on the order of several thousand dollars.

Many private residences and businesses currently have access to cable television (CATV) networks. Furthermore, most homes and businesses have access to at least one telephone communications system. These telephone and television systems provide a direct access to millions of locations from a small number of centralized locations.

A large bulk of mail today is computer generated invoices, letters, etc. A great deal of time and handling may be saved if the computer generated information is transmitted electronically to the ultimate addressee and then converted into human readable form. Not only would such a system realize postage and handling cost savings, but would also provide the added benefit of reducing the load on our overburdened postal system.

Existing cable TV networks, telephone systems, or other communications media which have direct access to homes and businesses provide a readily available electronic link for transmitting many types of information directly to a large number of addressees. What has been needed to complete a true electronic information dissemination system is the means to efficiently collect electronic information signals from various sources, the means to efficiently and effectively process it for transmittal over an available communications network, and low cost means at the ultimate destinations for receiving the electronic information and converting it into usable form.

SUMMARY OF THE INVENTION

An electronic information dissemination system embodying the invention includes a central station for receiving computer generated data. The information is disseminated from the central station to a plurality of remote stations. The central station includes a computer equipped and programmed for storing the data as it comes in. The central station processes the data received in order to translate the information to be disseminated. The computer is programmed to identify the source of the data and also to identify any special characters, graphics, or information which must be translated to a form understandable by receiver/decoders located at each of the remote stations.

The central station is also connected for access to a communication network such as a cable TV or switched telephone system which serves as the transmission medium. The central station is equipped with appropriate interface means so that the data may be transmitted in a format suitable for the chosen communication network.

The receiver/decoders at the remote stations may include a printer of the inexpensive dot matrix type. Each receiver/decoder is programmed to selectively receive data by recognizing a distinct address or code which is unique to it, plus a global address or code which is recognizable by all receiver/decoders in the system or a selected subsystem thereof. By using a global address, information which is common to all addressees may be transmitted and received simultaneously by all remote stations. Each receiver/decoder is also equipped with memory for temporarily storing the received information. Each receiver/decoder analyzes the incoming data for errors and if the data is error-free, enables the printer to reproduce the information in human or machine readable form when the end of the data transmission is detected.

The printers are capable of printing not only the standard ASCII character set, but also optically scannable optical character recognition numeric font (OCR-A), block graphics, and special characters such as logos, symbols, or foreign alphabet characters. The forms used in the printers are composed of heavy paper stock which has been pre-perforated. The perforations ensure a uniform size sheet for infrared optical scanning.

BRIEF DESCRIPTION OF THE DRAWINGS

The foregoing summary, as well as the following detailed description of a preferred embodiment of the invention, will be better understood when read in conjunction with the appended drawings, in which.

DESCRIPTION OF THE PREFERRED EMBODIMENT

The Information Dissemination System

Figure 1:
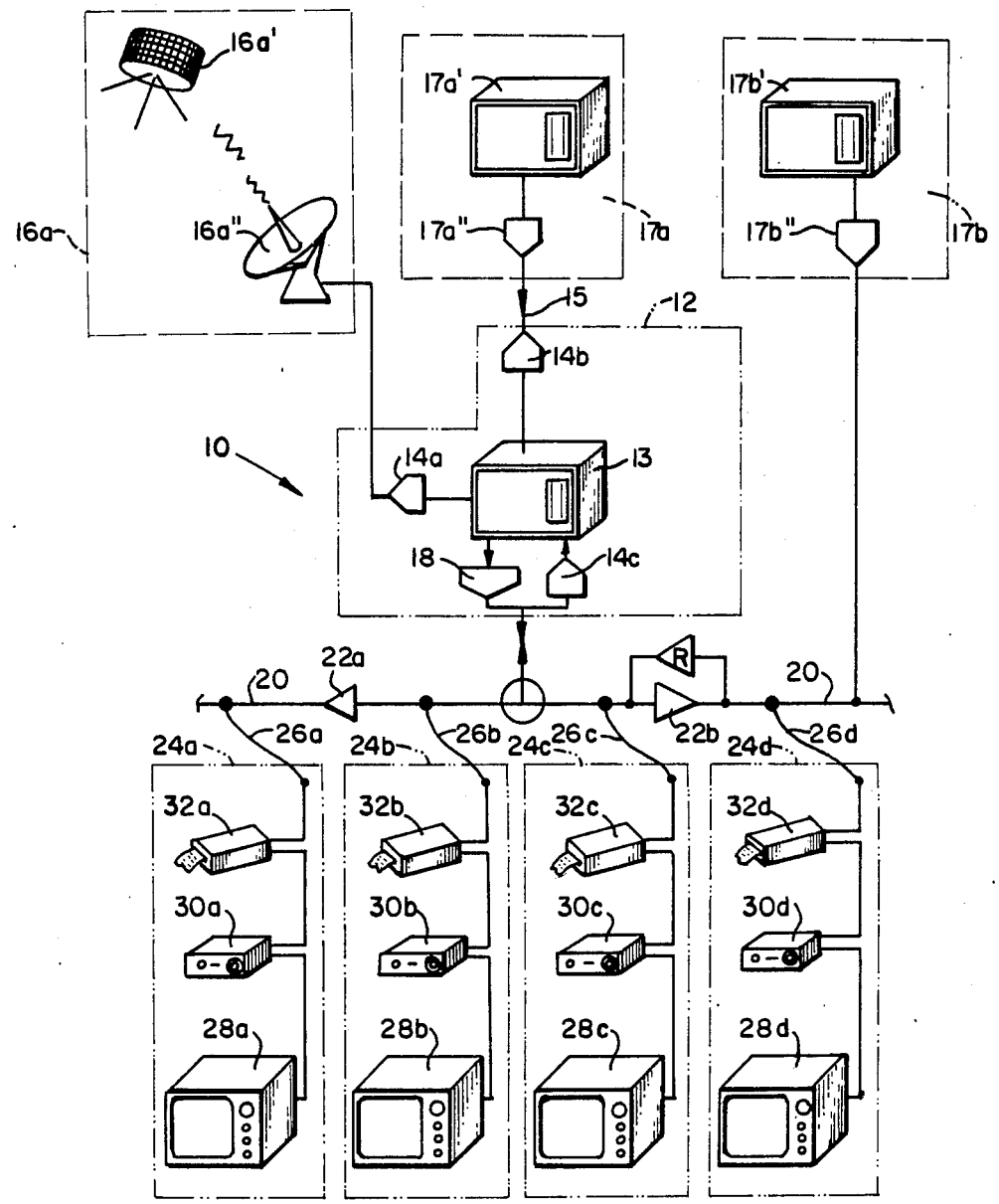
FIG. 1 is a diagram of an information dissemination system according to the present invention.

Referring now to the drawings, and in particular to FIG. 1, there is shown generally an information dissemination system (IDS) 10, which includes generally a central station 12, a number of feeder stations 16a, 17a, 17b, a transmission medium 20 such as a cable TV system, and a plurality of remote stations 24a-d. The central station 12 receives information for dissemination from one or more of the feeder stations 16a, 17a, or 17b. Central station 12 is equipped to process the incoming information and encode it with one or more codes or addresses, one of which is global, for dissemination to the remote stations 24a-d. The information is represented by both global data and packets of personalized data. The global data consists of downloadable characters such as block graphics, logos, symbols, etc. The personalized data consists of printable text such as invoices, letters, announcements, etc. The global data is coupled to the global code or address and each packet of personalized data is coupled to a distinct code or address which is unique to each remote station 24a-d. Each remote station 24a-d is connected to the communication network 20 and is equipped for selectively receiving global data under the global address and personalized data only under its own distinct address. Each remote station 24a-d has memory means for storing the received data as well as means for error checking. When the data transmission is complete, and if no errors are detected, then the information contained in the received data is reproduced in human or machine readable form by means of a printer 32a-d or other output device.

The central station 12 includes a computer 13, a plurality of receiver/demodulators 14a-c, and a signal converter 18. Central station 12 is set up to receive data containing information to be disseminated from the various feeder stations 16a, 17a, or 17b. (Note: throughout this specification, the term "data" is defined to mean any representation such as characters or analog quantities to which meaning might be assigned. The term "information" is defined to be the meaning assigned to data by known conventions.)

The feeder stations 16a, 17a, 17b are diverse and may include the cable TV company, public utilities, credit card billing agencies, government agencies, or any organization which disseminates computer generated messages or information to a large number of addressees. The feeder stations may be located at small or great distances from central station 12. Accordingly, central station 12 is equipped to receive data by a variety of data transmission modes.

Information feeder station 16a represents an information source located at a great distance from the central station 12 which transmits data signals via microwave or a communication satellite 16a'. Such signals are received by an antenna 16a" and input through a receiver/demodulator 14a in central station 12 to computer 13. Feeder stations 17a and 17b which are closer in distance to the central station 12 have their respective information generating computers 17a' and 17b' linked directly to the central station 12. In the case of local source 17a, its computer 17a' is coupled to a telephone line 15 through a telephone modem 17a". The telephone line 15 provides the link to the central station 12. A telephone modem 14b within the central station 12 interfaces telephone line 15 with computer 13. Likewise, in a locality where a cable television local area network (LAN) is available, source 17b may have its computer 17b' coupled to the communication network 20 through an RF modem 17b". The communication network 20 provides the data link between feeder station 17b and central station 12. At the central location, an RF modem 14c converts the data signal for input to computer 13.

Computer 13 may be a general or special purpose computer of conventional design programmed to perform a variety of data processing tasks. Computer 13 is programmed, for example, to translate the data signals input from the various feeder stations to a format suitable for use in the information dissemination system. It should be capable of receiving information from any transmission medium, at any speed, and at any protocol. Computer 13 is also equipped with sufficient memory to store the data signals which it receives for later transmission to the remote stations 24a-d.

Central computer 13 also has the capability to transmit control codes to the various receiving locations. These codes can be used to enable or deny basic cable television service, switch electrical loads on or off in an energy management system, or implement other control functions at the remote locations. In the situation where central station 12 is used to control access to a cable television system, computer 13 is programmed to maintain a file of which subscribers are authorized to have service and which are not.

Signal converter 18 is connected at the output port of digital computer 13 for interfacing with the communication network 20. Signal converter 18 consists of any of the conventional processors for converting a data signal into a suitable signal format for transmission over the communication network 20. In many applications, the suitable signal format will be a radio frequency signal which is appropriately modulated, such as a frequency shift keyed RF signal. In other applications, for example where the transmission medium consists of a switched telephone network, signal converter 18 is designed to perform other appropriate signal conversion, such as phase shift keying of the data signal.

When the communication network 20 consists of a cable television system of conventional design, amplifiers such as 22a and 22b are provided in the network 20 to compensate for signal attenuation when transmission to the remote stations 24a-d must be effected over great distances.

The remote stations 24a-d are each connected to the communication network 20 by means of access connectors 26a-d, respectively. The remote stations 24a-d generally include television receivers 28a-d, cable television signal decoders 30a-d, and information receiver/decoders 32a-d.

Alternatively, if a significant portion of the relevant community is not served by a cable television network, then the local switched telephone network may be used instead. Any one of several schemes for transmitting data over the switched telephone network may be employed, depending on the type of central telephone office involved.

A first scheme for utilizing the switched telephone network involves reversing the polarity of the loop from the central office to signal the receiver/decoders 32a-d to go on line. The data signals may then be transmitted under the appropriate system data transmission standards. If a person attempts to use the telephone during transmission of a data signal, the particular receiver/decoder relinquishes control, abandons printing, and the data signal may be transmitted again at a later time.

Another scheme for transmitting the data signals over a switched telephone network involves the application of a high frequency carrier signal to the telephone line. This carrier signal can be filtered out at the receiving end so that data signals may be transmitted while the telephone is in use without a user being aware of it.

A further option for the transmission medium is FM broadcast subcarrier authorization (SCA). This medium involves an inaudible RF signal, usually about 68 kilohertz, superimposed on an existing FM station's broadcast signal.

Other transmission media may also be suitable for use in the information dissemination system 10. The principal criterion for the transmission medium is that it be capable of reaching a multitude of remote locations which may be great distances from the central station 12.

The Receiver/Decoder

Figure 2:
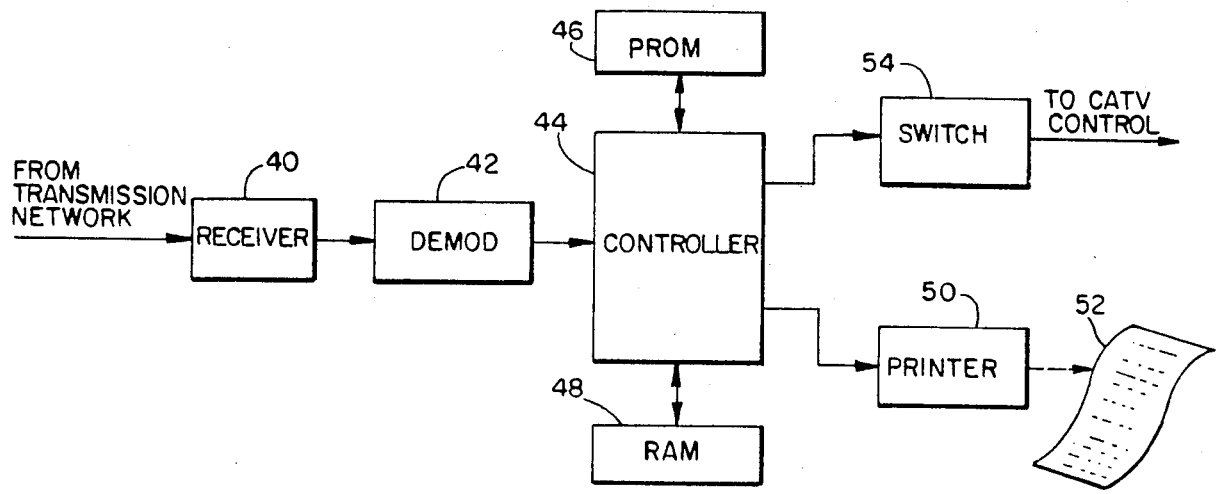
FIG. 2 is a block diagram of a typical receiver/decoder including a printer used in the system of FIG. 1.

Referring now to FIG. 2, there is shown a block diagram of a receiver/decoder device 32a, according to the present invention. The device 32a includes a printer, and hereafter will be referred to as a receiver/printer. Only receiver/printer 32a will be described in detail since all of the receiver/printers 32a-d on the sytem are identical. A receiver 40 is connected to the transmission medium for receiving the data signals therefrom. A demodulator 42 or other type signal converter is connected to receiver 40 for translating the RF coded signal into a digital data signal. A controller circuit 44 is connected to the output of demodulator 42 for processing the incoming data signal. Controller circuit 44 performs several tasks upon receiving the serial digital data signal.

For example, controller circuit 44 accesses information stored in a read-only memory, in the present instance a programmable read-only memory (PROM) 46, to determine if the data signal contains an address which is directed to the particular receiver/printer. Controller circuit 44 also determines whether there are any errors in the data signal. If the received signal is valid, then the data contained therein is stored in a random access memory (RAM) 48. Controller circuit 44 also determines when the transmission of the data signal is complete. When the end of the transmission is detected, controller 44 accesses the information stored in PROM 46 and RAM 48 to prepare printing instructions to be sent to printer 50. Upon receiving the printing instructions from controller 44, printer 50 is enabled to produce a hard copy 52 of the information stored in RAM 48.

In addition to its printing functions, controller 44 also discerns control signals from the central processor for controlling access to the cable television system or other functions. Upon receipt of such a signal, controller 44 provides an instruction to switch 54 to either turn on or turn off access to the cable television system for the particular remote location.

Figure 3:
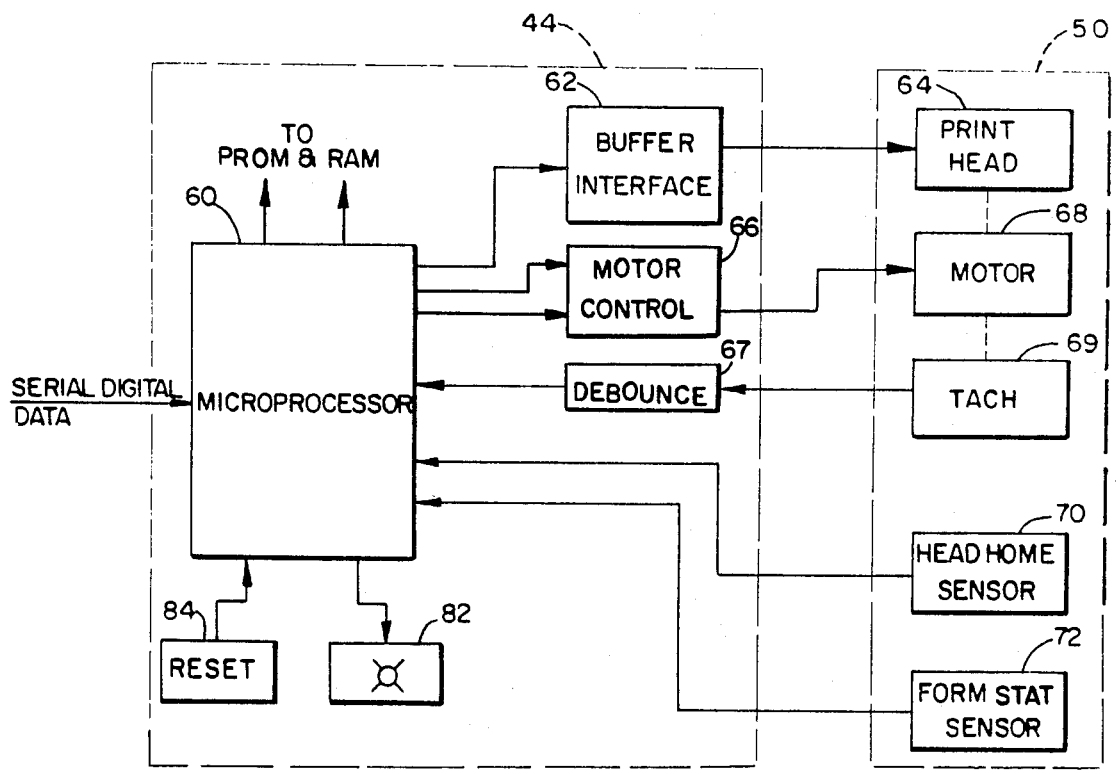
FIG. 3 is a block diagram of a control scheme for the receiver/decoder of FIG. 2.

Referring now to FIG. 3, there is shown a more detailed block diagram of the controller circuit 44 and printer 50 of FIG. 2. Controller circuit 44 comprises a microprocessor 60 of conventional design programmed to perform the various control functions for the receiver/printer 32a. Microprocessor 60 is a principal component of the receiver/printer 32a and has ports for interfacing with PROM 46 and RAM 48. Microprocessor 60 provides printing instructions via an interface 62 to the dot matrix printhead 64 in printer 50.

Printhead 64 is moved across the print form by motor 68. A tachometer 69 is coupled to motor 68 and provides feedback signals indicative of the position of printhead 64. A motor control circuit 66 is provided to interface microprocessor 60 and motor 68. Motor controller 66 receives direction signals from microprocessor 60 and converts them to an appropriate form for operating motor 68. Likewise, a debounce circuit 67 receives feedback signals from tachometer 69 and debounces them for input to microprocessor 60.

Head home sensing means 70 in printer 50 signals microprocessor 60 when printhead 64 is in the "home" or start position. Form status sensing means 72 is provided to signal microprocessor 60 when the perforation on the form is at the proper position to begin printing, when the supply of paper forms is low, or when the form supply is out. If the paper supply is low or out, the microprocessor 60 turns on indicator light 82.

Figure 4:
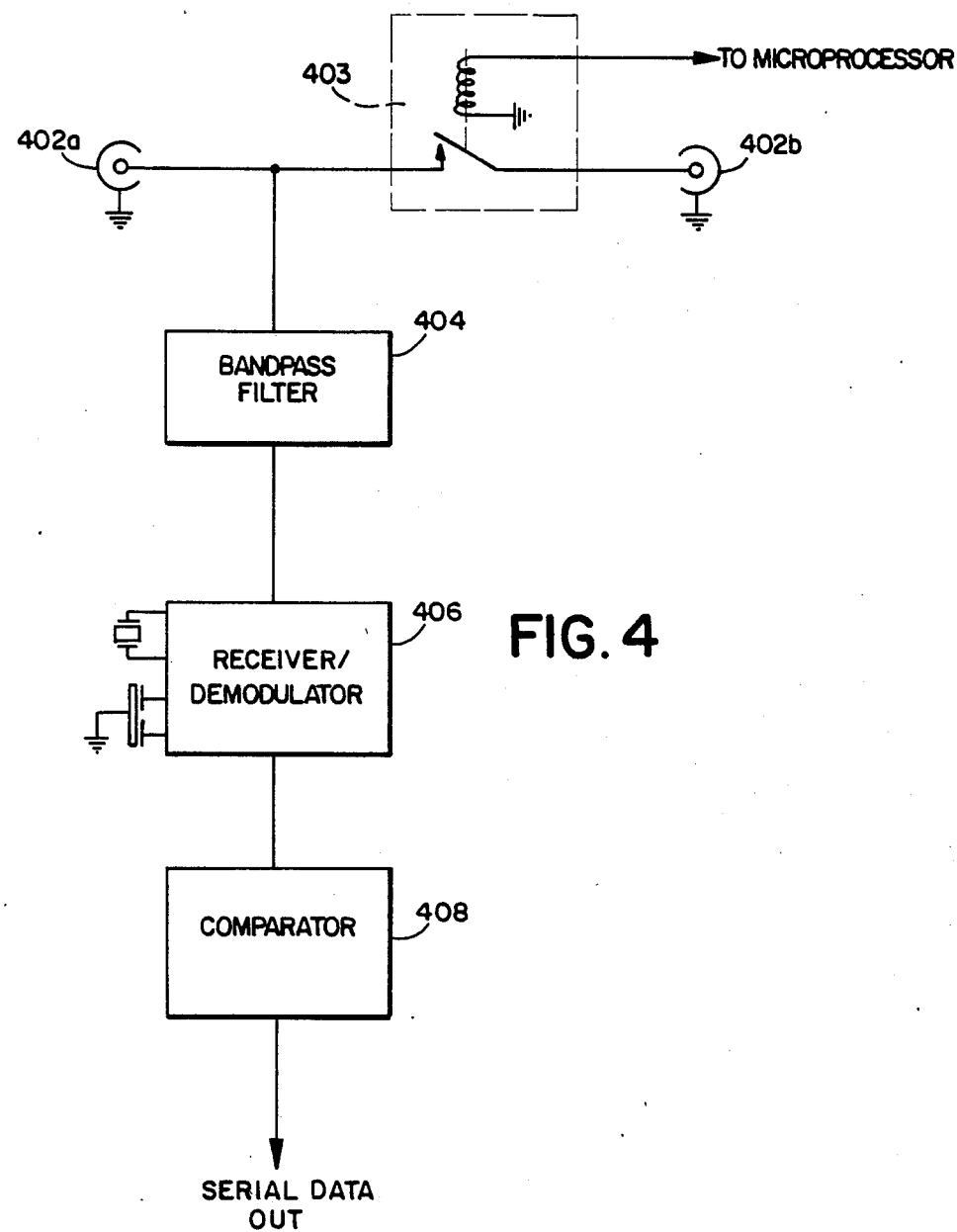
FIG. 4 is a block diagram of an RF/demodulator circuit used in the receiver/decoder of FIG. 2.
Figure 5:
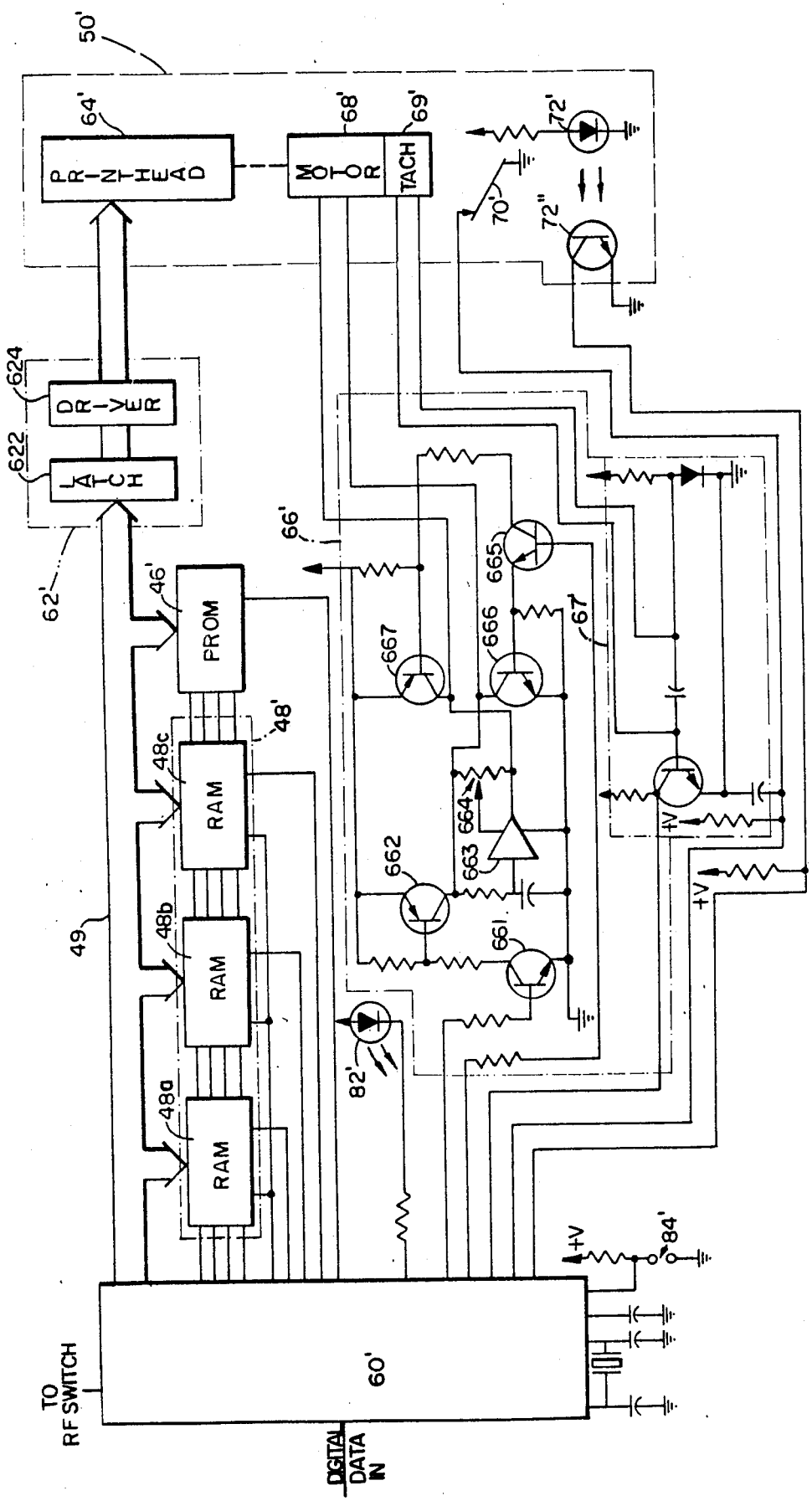
FIG. 5 is a schematic diagram of a control circuit, printer mechanism, and associated memories used in the receiver/decoder of FIG. 2.

FIGS. 4 and 5 are diagrams of circuits for the various functional elements of a receiver/printer such as 32a. Referring now to FIG. 4, there is shown a suitable configuration of a receiver circuit 40 as shown in FIG. 2 for use when the data signals are carried by RF signals. The receiver circuit 40 includes an input connector 402a and an output connector 402b which may be coaxial cable jacks of conventional design. A relay 54 is provided for switching output connector 402b on or off to enable or deny basic cable TV service or to perform some other control switching function. An appropriately tuned bandpass filter 404 is connected to input jack 402a. An RF receiver/demodulator 406 is coupled to the bandpass filter 404 for providing an intermediate frequency (IF) signal from the RF filtered signal. RF receiver/demodulator 406 is connected to a comparator 408 which converts the IF signal to an analog signal representing digital information.

FIG. 5 shows a preferred embodiment of circuitry for the printer, controller, and associated memories as shown in FIGS. 2 and 3. In the embodiment shown in FIG. 5, there is a single programmable read-only memory (PROM) 46' which contains the unit's addresses, OCR character font, and baud rate. The static RAM 48' is realized by three RAM chips 48a, 48b and 48c for downloading the character and textual information received. The PROM 46' and RAM chips 48a, 48b, and 48c are connected to microprocessor 60' through bus 49. The microprocessor 60' is of conventional design, but specially programmed to perform the data processing functions described below. An interface 62' is connected through bus 49 for interfacing between the printer head 64' and microprocessor 60'. Interface 62' includes a data latch 622 of conventional design such as a parallel latch and a driver 624 for actuating the dot printers in the printhead 64'.

The printer 50' is a conventional thermal-type design. This type of printer usually has a nine-dot printhead 64' which can print either 40 or 80 columns and can feed the paper form at the rate of either 8 or 12 dots at a time.

The printhead 64' is driven across the paper form by means of drive motor 68'. Motor control circuit 66' provides speed control to motor 68' in either the forward or reverse direction. The motor control circuit 66' is designed such that the motor speed in the forward direction may be adjusted, while the motor speed in the reverse direction for return is maximized.

Operation of motor control circuit 66' may be described generally as follows. When printhead 64' is printing a line, microprocessor 60' generates a high signal which turns on transistor 661. Transistor 661 then begins to conduct and turns on transistor 662. When transistor 662 is thus turned on, it supplies power to speed regulator 663 which in turn supplies the motive power to motor 68' in the forward or print direction. The speed of motor 68' is controlled by means of potentiometer 664 which is used to adjust the output of speed regulator 663.

When printhead 64' reaches the end of a print line, microprocessor 60' generates a high signal which turns on transistor 665. When transistor 665 begins to conduct, it turns on transistors 666 and 667 which reverse the voltage and maximize it such that the motor is reversed and the printhead can return to the home position at full speed.

A tachometer 69' is coupled to motor 68' such that it provides pulses corresponding to the revolutions of motor 68'. The tachometer signals are transmitted to a debouncing circuit 67' for eliminating spurious pulses. The qualified pulses are input to microprocessor 60' which counts the pulses received in order to determine and monitor the position of the printhead 64'.

Various sensing means are located in the printer 50' for checking the position of the printhead, the position of the forms relative to the printhead, and the level or availability of the paper forms. A limit switch 70' is provided for sensing when the printhead 64' is in the home or start position.

Figure 6:
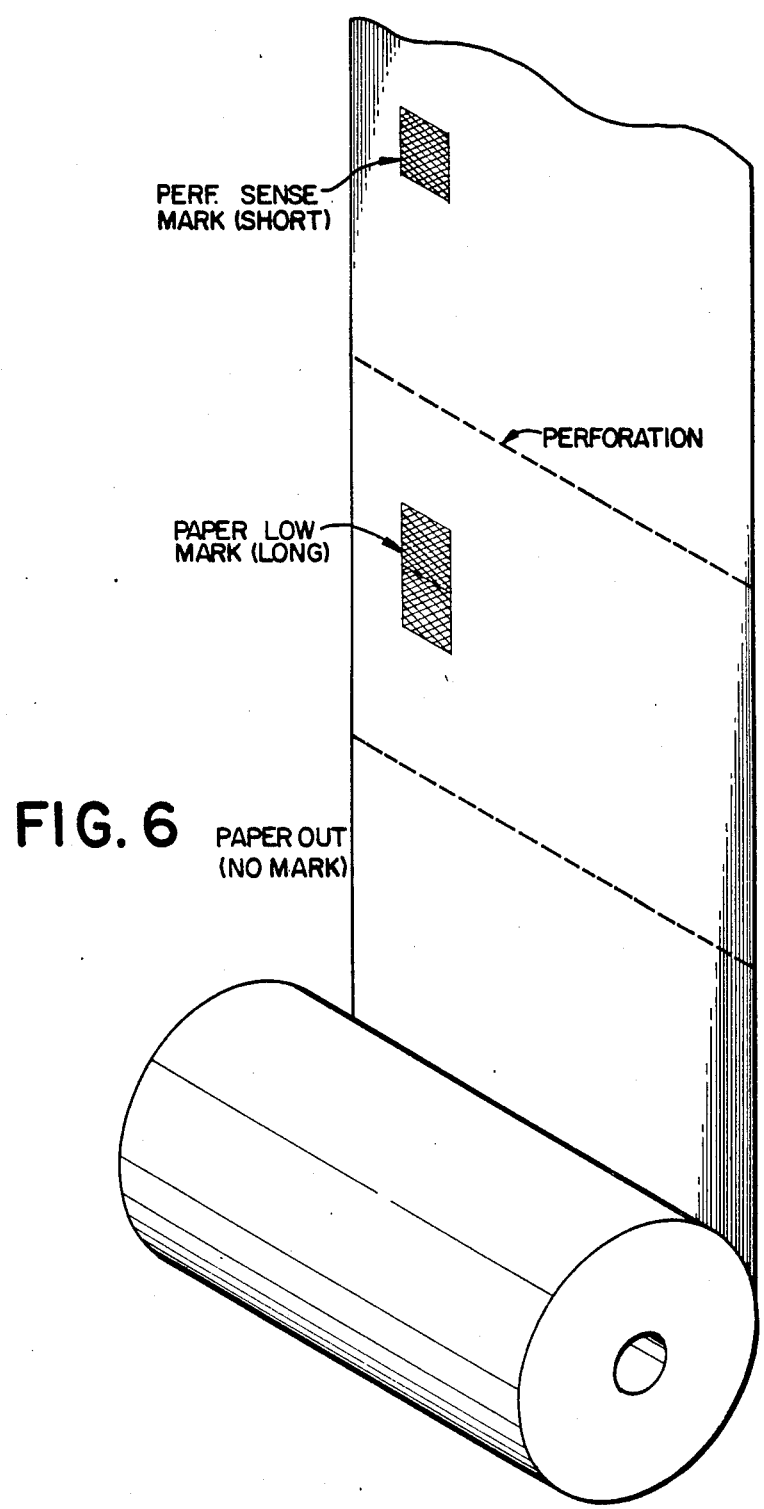
FIG. 6 is a representation of the print forms used in the receiver/decoder of FIG. 2 showing the arrangement of the control marks printed thereon.

The form status sensor 72 of FIG. 3 is realized in the embodiment of FIG. 5 by a photo-optical sensor. This photo-optical sensor comprises a light-emitting diode (LED) 72', and a photo transistor 72". A photo-optical sensor of this type is used for identifying markings on the paper form which convey certain information such as paper form position for printing, paper supply at low limit, form supply empty, etc. FIG. 6 shows a possible arrangement of such marks on a roll of forms. In the present instance the detection of a short mark indicates that the form is properly aligned to start printing. A long mark indicates that the paper supply is getting low. The absence of a mark indicates that the supply is exhausted. The marks are solid black, printed with high carbon ink on the back side of a roll of infrared thermal paper. When the paper-low mark is sensed, the microprocessor 60' turns on LED 82'. LED 82' is located externally on the receiver/printer 32a for indicating to the customer that the paper supply is low or out.

System Operation

An understanding of the operation of the electronic information dissemination system according to the invention may be had by referring to FIGS. 1, 2, 3, and 7 in conjunction with the following description. In a typical situation, central computer 13 receives batch billing information, or some other kind of bulk mail, from a source, for example an electric utility company as represented by feeder station 17a in FIG. 1. The utility company's billing computer 17a' generates the billing information in electronic or digital form. This information is then converted to transmission signals by a modem 17a" and transmitted over a dedicated telephone line 15 to the central station 12 of information dissemination system 10.

The transmitted signals are input to the central computer 13 through modem 14b. Once the information has been received, the central computer 13 first checks for the presence of any logos, graphic artwork, or special characters which are not normally programmed into the character font memory of the remote printers. If any such special data is detected, central computer 13 prepares a data header describing these special parameters. The header constitutes the "global data" and includes instructions readable by the remote receiver/printers 32a-d for reproducing the special characters or other graphics. This header along with the billing information may then be stored in a memory device to await transmission over the system.

When a transmission path becomes available, central computer 13 applies a global address to the header. This global address is recognizable by all of the remote receiver/printers 32a-d so that the data header may then be received simultaneously by all the remote stations.

The central computer 13 next applies a distinct address to each packet of billing information identifying it for a particular remote station, for example station 24a. Each packet of billing data is preceded by a remote station's address and is followed by a check sum for error detection. When all of the billing data has been received, the receiver/printer 32a stops receiving data and prepares to print the received information. In order to provide security of the system, central computer 13 is programmed to scramble the personalized information before transmission. Only authorized receiver/printers 32a-d are capable of unscrambling the personalized information prior to printing.

Central computer 13 also has the ability to send control codes to the remote receiver/printers 32a-d. These codes can be used to enable or deny basic cable service, switch electrical loads on and off such as in an energy management system, or to implement other remote control functions. In the event the codes are used to enable cable television service, central computer 13 maintains a memory file of which subscribers are authorized to have service and which are not. Periodically, when the system is available, central computer 13 will retransmit these codes to ensure that all subscribers have proper access to cable television service.

Signal converter 18 interfaces the central computer 13 and the communication network 20. It accepts digital data from the central computer 13 and produces a frequency shift keyed RF carrier signal for transmission of the digital data to the remote receiver/printers 32a-d. Frequencies of 74.950 megahertz for a mark (zero) and 75.050 megahertz for space (one) are preferred, but if there is an interfering carrier at those frequencies, the system may be tuned for another frequency pair. The frequency shift keyed signal is then put out over the transmission medium which is primarily intended to be an existing, unmodified cable television system 20.

Data signals containing a global address are transmitted to all of the remote receiver/printers 32a-d. This permits information which is to be received by all locations to be transmitted at one time. It is possible with this system to disseminate information to all of the remote locations 24a-d by using a global address. Where the data signal also includes distinct local addresses, the information contained in those data signals is printed only by the selected remote receiver/printers having such addresses stored in their memories (PROM 46).

A transmitted data signal consists of a stream of asynchronous bytes sent as a group. The bytes will consist of a start bit, eight data bits and an idle or stop bit. Idle times between bytes in a group are usually between one and two bit times long. Idle times between groups will be at least 20 bit times long. The bytes of data in a data transmission will usually consist of two bytes of address followed by a variable length information field. The data transmission is completed by two bytes of checksum. The checksum is an error detecting code, such as CRC-16, calculated over all the bytes in the group except the last two. Data bytes are transmitted with the least significant bit first. Accordingly, the data sense indicator at the microprocessor will be high for data equal to one or an idle time and low for data equal to zero or a start bit.

The receiver/printer unit 32a is normally in the receive mode. While in this mode it waits for an idle period on the line of preselected duration. When an idle time of sufficient length has been detected, the unit will then start to receive data bytes until either an error or an idle period of a second preselected duration occurs. During this time all receivable signals incident on receiver 40 are received, converted, and then stored in RAM 48'.

Data bytes are received by watching the start bit stay active for a predetermined time period. The data bits and a stop bit are then sampled at whole bit times from the middle of the start bit. If the start bit does not last for the proper time period or if the stop bit is not idle, then the received character is judged to be in error and the receive mode is restarted. Whenever an error occurs in the receive mode, an error flag is set. If a data error is detected and the error flag set, then the textual information will not be printed. In order to rectify the situation, the customer contacts the source organization to inform them that he has not received his bill or other information. The information may then be retransmitted.

The information field of the data bytes generally consists of a stream of print commands and/or control sequences. A print command is a contiguous set of bytes containing printable character codes, spacing command codes, new line codes, and/or new page codes. A command causes the printhead mechanism to be started, the bytes to be executed, and then the printer to be stopped. The printer always starts at the beginning of a line which may or may not be the beginning of a page. A printable character code causes the dot pattern for a particular character to be printed. A spacing command causes the printhead to move over one or more spaces. Similarly, new line codes and new page codes cause the paper form to advance either to the next print line or to a new page.

A control sequence consists of a data byte containing a control code. Control codes are used to set the state of a control output, to load special character patterns into the static RAMS, or to set a printer mode. Generally there are no constraints on the order or length of an information field except that it must fit in the area allocated to it in the static RAM 48.

Figure 7:
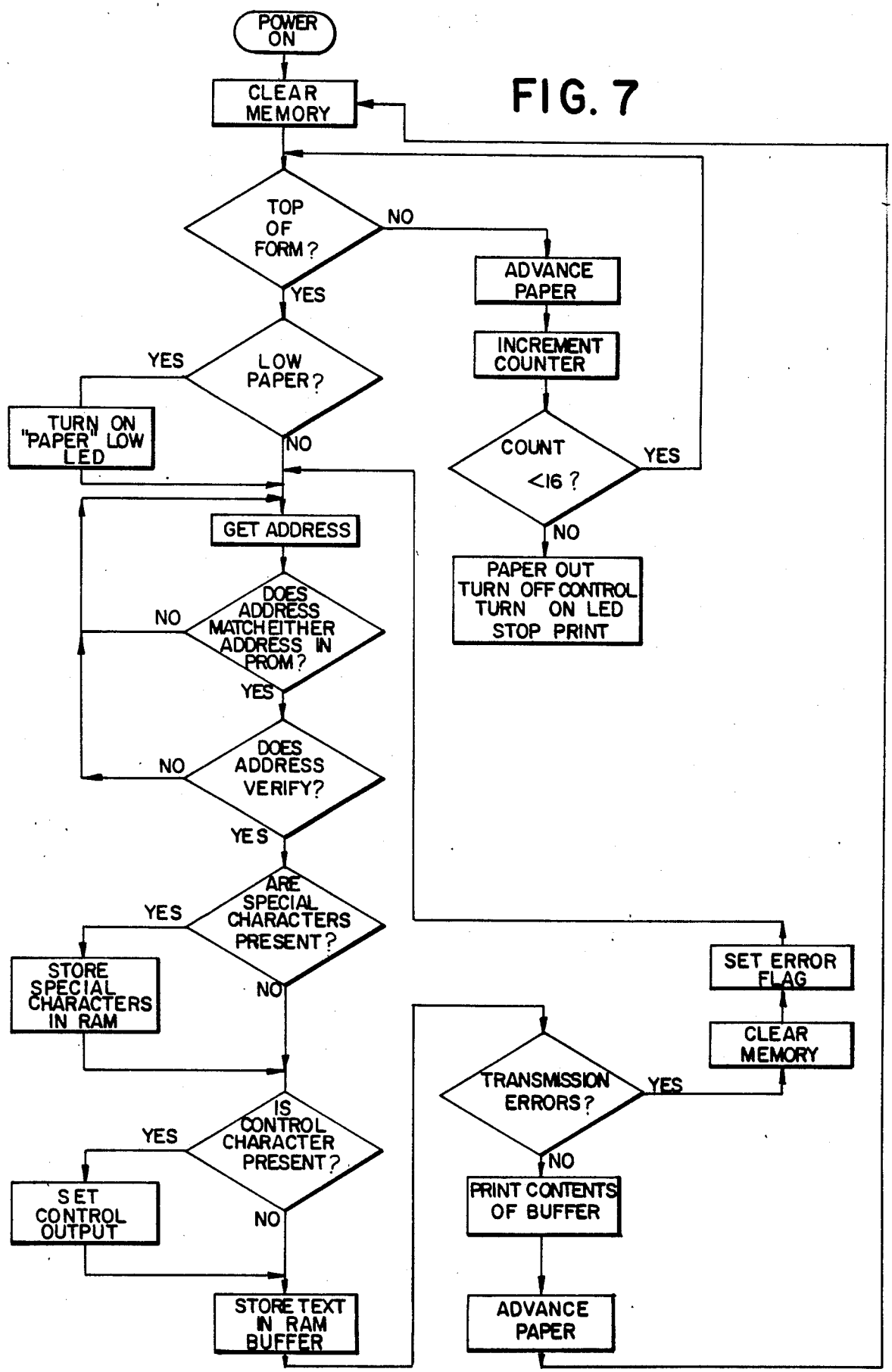
FIG. 7 is a flow chart describing the basic operation of the receiver/decoder of FIG. 2.

Referring now to FIG. 7, there is shown a flow chart representing the processs by which information is received and printed in a remote receiver/printer 32a according to the invention. When power to the unit is initially turned on, or restored after some power outage, all of the memories and registers, with exception of the PROM 46, are cleared. Next, or if the receiver/printer is already on, the microprocessor 60 checks that the printhead 64 is correctly positioned at the top of the print form. If the form status sensor 72 does not detect the presence of the top of the form mark, then the paper is advanced one line and a counter incremented. This loop is repeated until the top of the form mark is sensed or the count exceeds some preselected number, for example a number that is slightly larger than the maximum number of print lines on the form. In FIG. 7 the number sixteen has been selected. If the count reaches the preselected number without detecting the perforation sense mark, this is an indication that the receiver/printer 32a is out of paper forms and the appropriate actions are taken by the microprocessor 60: the printer is turned off, the LED 82 indicating "paper-out" is turned on, and any printing in progress is stopped.

When the top of the form is advanced to the proper position to begin printing, the microprocessor 60 then checks to see if the low paper mark has been detected by the paper status sensor 72. If the supply of paper forms is low as indicated by the paper status sensor 72, then LED 82 indicating a low paper level is turned on.

If the paper supply level is not low or after LED 82 has been turned on, the microprocessor 60 fetches the first address received and stored in RAM 48. Microprocessor 60 then determines whether the received address matches either of those stored in PROM 46. If not, the microprocessor 60 then fetches the next address. This loop is repeated until a received address matches either the global address or the local address stored in PROM 46. The microprocessor 60 then verifies the received address. If the received address cannot be verified, then microprocessor 60 attempts to fetch the next address. If the previously received address is verified, then the microprocessor determines whether there are any special characters present.

If special characters are present in the data signal, then they are stored in RAM 48. On the other hand, if there are no special characters present, then microprocessor 60 checks for the presence of any control characters. If there are control characters present, then microprocessor 60 sets the proper control status by energizing or de-energizing the control switch 54. When this is complete or if there are no control characters present, then microprocessor 60 writes the printable text in the personalized data packet to the RAM 48.

Next, microprocessor 60, by calculating the checksum byte, checks for transmission errors in the received information. If there are such errors present, then the memory is cleared and the error flag is set. Microprocessor 60 then attempts to fetch the next address received and the above-described process is restarted.

If microprocessor 60 does not detect any errors in transmission of the data signal, then it begins to read the downloaded characters and the printable text in RAM buffer 48 to the interface 62 such that the information contained in these combined data may be printed by printhead 64. When the global and personalized information stored in RAM 48 has been completely printed, microprocessor 60 causes the paper form 52 to be advanced to the next page and restarts the receive mode by checking to see that the top of the form is in the start position and by clearing the personalized data in RAM 48. The global data stored in RAM 48 is not erased.

It will be appreciated that the process represented by the flow chart of FIG. 7 necessarily includes many smaller steps and decisions. However, the flow chart adequately represents the generic steps and decisions which must be made by the remote receiver/printer in the course of operation of the information disseminating system according to the invention.

Some of the many advantages and novel features of the invention should now be apparent in view of the foregoing description and accompanying drawings. For example, an information dissemination system has been described which consists of multiple, individually-addressable printers and one set of centrally located addressing and data handling equipment. The transmission path from the central location to the printers is normally provided by an existing cable television system, but may optionally be provided through a switched telephone network or other media.

The printers are the low cost dot matrix type. Each recognizes its unique address plus a common "global" address. The printers are capable of printing not only the standard ASCII character set, but optically scannable OCR-A numeric font, block graphics, and downloadable characters such as logos, symbols or foreign alphabet characters as well. The forms used in the printers are heavy paper stock which has been pre-perforated to ensure a uniform size for optical scanning.

It will be recognized by those skilled in the art that changes or modifications may be made to the above-described embodiment without departing from the broad inventive concepts of the invention. For example, aside from the delivery of electronic mail, the system can provide year-end accounting services and date reminder services for the home by use of the computer at the central station. The system may also be made interactive by interfacing a telephone line having a tone decoder and voice response unit to a data base and the central equipment. In this configuration, a subscriber may telephone a designated number and through the use of the tone dial on his phone, request printed information such as weather forecasts, entertainment information, stock quotes, etc. It is understood, therefore, that the invention is not limited to the particular embodiment which is disclosed, but is intended to cover all modifications and changes which are within the scope and spirit of the invention as defined by the appended claims.

What is claimed is:

1. A system for use with an existing communication medium for disseminating desired information to a plurality of remote stations, said system having at least one feeder station to supply the information, a central station to receive and encode the information for transmission, and a plurality of remote stations to receive the encoded information and output the same in human or machine readable form, wherein said system comprises:
    data processing means for encoding information at the central station and for transmitting same, said data processing means including means for providing a global code for global data common to all of said plurality of remote stations and a distinct code for personalized data assigned to each one of said plurality of remote stations, and means for coupling global data with the global code and personalized data with each of the distinct codes;
    interface means for linking the central station to the existing communication medium whereby the encoded information from the data processing means may be transmitted to all of said plurality of remote stations;
    selection means accessible to the communication medium at each remote station for receiving and selectively remembering the global data coupled with the global code and the personalized data coupled with the distinct code assigned to the remote station; and
    output means at each remote station for reproducing the information represented by a combination of the global data and the personalized data assigned to the remote station and received and remembered by said selection means;
    said output means including data combining means for combining the personalized data for the particular remote station with the global data such that indicia are generated for reproducing the information represented by the combination of the global and personalized data.

2. An information disseminating system as recited in claim 1 wherein the global data includes special characters, logotypes, or graphics and said data processing means further comprises:
    data checking means for determining the presence of special characters, logotypes, or graphics in the global data; and
    data header means in communication with said data checking means for generating printing instruction information relating to the special characters, logotypes, or graphics.

3. An information disseminating system as recited in claim 1 wherein said interface means comprises:
    signal conversion means for converting the encoded data into radio frequency data signals suitable for transmission over the communications medium.

4. An information disseminating system as recited in claim 3 wherein the signal conversion means comprises means for forming a frequency shift keyed signal having first and second radio frequency states for representing the data signals.

5. An information disseminating system as recited in claim 3 wherein each selection means comprises:
    receiver means for receiving a radio frequency data signal;
    signal processor means connected to said receiver means for converting the radio frequency data signal into a digital data signal;
    first memory means for storing the digital data signal;
    second memory means for storing addresses at least one of which is unique to the particular selection means; and
    control means operatively interconnected with said signal processor means, said first memory means, said second memory means, and said output means for controlling operation of the selection means and the output means, said control means having two operating modes including a receive mode wherein said control means enables data identified by an address in said second memory means to be stored in said first memory means, and an execute mode wherein said control means enables said output means to read the data from said first memory means and to reproduce the information contained therein in human or machine readable form.

6. An information disseminating system for use with an existing cable television system comprising:
    central receiver means for automatically receiving an electronic data signal at a central location from a remote source, said data signal including source identification data and a plurality of discrete, personalized data packets representing printable text, said packets being distinctly identified for different ones of a plurality of remote stations;

data handling means operatively connected to said central receiver means and responsive to the electronic data signal for coupling a global address to the source identification data and a distinct local address to each of the personalized data packets such that addressed data are generated;

memory means associated with said data handling means for storing the addressed data;

signal conversion means operatively coupled to said memory means and the cable television system for converting the stored addressed data to a radio frequency signal distinct from the television signals but suitable for transmission over the cable television system;

remote receiving means coupled to said cable television system at each of the remote stations for receiving the source identification data and the personalized data packets contained in the radio frequency signal;

selector means operatively connected with said remote receiving means for identifying the source identification data under the global address and the personalized data packet under the distinct local address for the particular remote station;

data combining means associated with said selector means for combining the personalized data packet with the source identification data and generating print signals for reproducing the combination of the source identification data and the personalized data packet; and printer means responsive to the print signals for printing the information contained in the source identification data and the personalized data and the personalized data packet under the local address of the particular remote station.

7. An information disseminating system as recited in claim 6 wherein said signal conversion means comprises means for forming a frequency shift keyed signal having first and second frequency states for representing the data being transmitted.

8. In an information dissemination system of the type for transmitting data signals over distances from a central data handling station to a plurality of remote stations via an existing communication medium, wherein the data signals include both a global message under a global code common to all of the remote stations and individual messages under distinct codes that are each unique to particular remote station, the remote stations each having apparatus for receiving and printing the messages contained in the data signals, the apparatus comprising:

receiver means for receiving the data signals including the global message and the individual messages;

selection means operatively connected with the receiver means for identifying and storing the global message under the global code and an individual message under the distinct code for the particular remote station;

data combining means for combining the individual message with the global message and generating print signals for reproducing the combined global and individual messages; and printing means responsive to the print signals for printing the combined global and individual messages selected by the selection means.

9. A receiving and printing apparatus as recited in claim 8 wherein the selection means comprises:

first memory means for storing the codes and the associated messages contained in the received data signals;

second memory means programmed to store a global code and a distinct code;

first processor means for comparing the global code and the distinct codes contained in the data signals to the global code and the distinct code stored in said second memory means; and second processor means for storing the global message and the individual message under the distinct code in said first memory means.

10. A receiving and printing apparatus as recited in claim 9 wherein said printing means comprises: a printhead for printing characters in a line on a paper form;

motive means for moving said printhead across the printing line;

first sensor means for sensing the position of said printhead along the printing line; and second sensor means for sensing the status of one or more conditions of the paper forms, said conditions including the location of the paper form relative to said printhead, and the supply level of the paper forms.

11. A receiving and printing apparatus as recited in claim 10 wherein said motive means comprises:

a motor drivingly connected to said printhead; and motor control means operatively connected between said motor and said control means for controlling the speed of said motor, said motor control means being formed such that the speed of said printhead is regulated in the print direction and maximized in the return direction.

12. Receiving and printing apparatus as recited in claim 10 wherein said second sensor means comprises:

markings imprinted on the paper forms, said markings being formed to indicate the top of the form, a low supply level of form paper, and an exhausted supply of form paper; and photo-optic means for detecting the presence of one or more of said markings and for providing a corresponding detection signal to said control means.

13. In an electronic communication system a method for disseminating personalized information from a central station to a plurality of remote stations through said communication system comprising the steps of:

receiving data at the central station from one or more sources, said data including standard and personalized data;

encoding the data at the central station by coupling a global code to the standard data and distinct codes to the personalized data, said distinct codes being associated with different ones of the remote stations:

transmitting the encoded data over the communications system to all of the plurality of remote stations;

receiving the encoded data at each of the remote stations;

processing only that part of said received data consisting of the standard data coupled to the global code and the personalized data coupled to the distinct code for the respective remote station to provide personalized information; and generating a human readable display of the personalized information contained in the combination of the processed standard and personalized data.

14. A method as recited in claim 13 wherein the step of encoding the data comprises the steps of:
- checking the standard data for the presence of special characters, logos, or graphic artwork;
- generating a data header including printing instruction codes for the special characters, logos, or graphic artwork; and
- coupling the global code to the data header whereby the data header may be transmitted to all of the plurality of remote stations simultaneously.

15. A method as recited in claim 14 wherein the step of processing the encoded data at each remote station comprises the steps of:
- storing the received data in a memory device; and
- checking the received data signal for errors.

16. A method as recited in claim 15 wherein the step of generating a human readable display of the personalized information contained in the encoded data comprises the steps of:
- retrieving the received data from the memory device;
- interpreting the information contained in the received data;
- generating a plurality of printing and control commands based on the information in the received data; and
- providing the printing and control commands to a printer responsive thereto, whereby the personalized information being disseminated may be printed onto paper forms.

* * * * *